March 21, 1967      J. A. NICOSIA      3,309,827
EXPANDABLE BUILDING PANEL
Filed Nov. 8, 1965
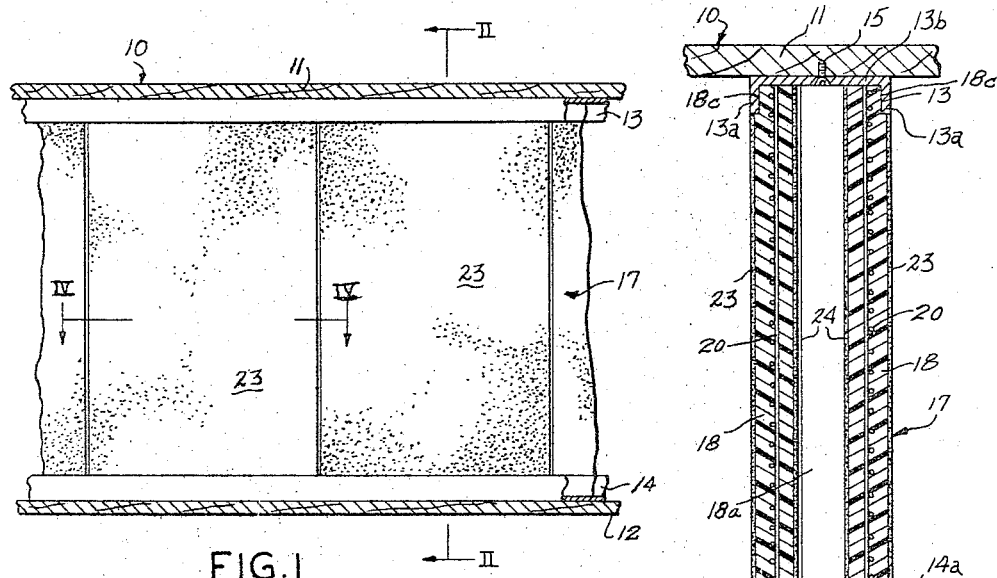
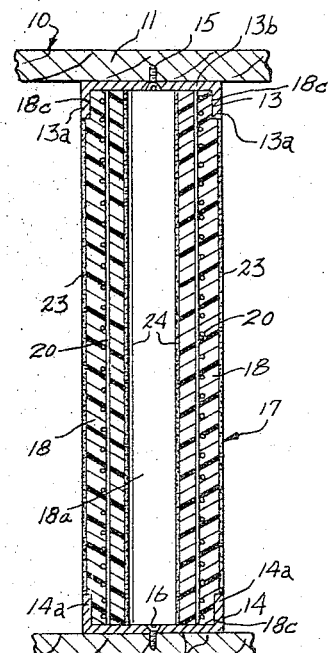
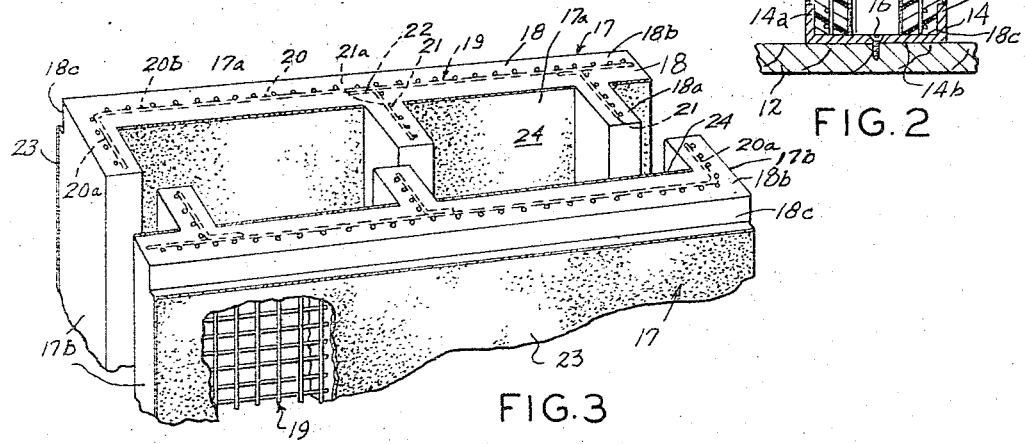
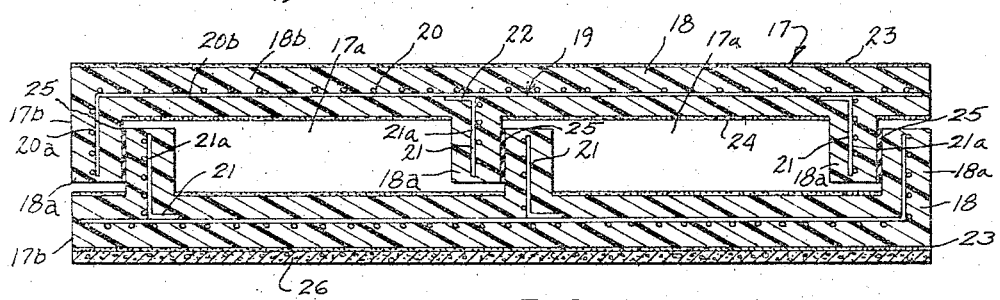
INVENTOR.
JOSEPH A. NICOSIA
BY
ATTORNEYS

United States Patent Office 3,309,827
Patented Mar. 21, 1967

3,309,827
EXPANDABLE BUILDING PANEL
Joseph A. Nicosia, 819 N. Thatcher Ave.,
River Forest, Ill. 60305
Filed Nov. 8, 1965, Ser. No. 516,819
10 Claims. (Cl. 52—241)

The present application in a continuation-in-part of my copending application, Serial No. 199,698, filed June 4, 1962, now abandoned.

This invention relates generally to an expandable building panel and the method of making said panel and more particularly to the method of making an expandable building panel of foamed synthetic resin.

Foamed synthetic resins, such as polyurethane, are known to have excellent insulating properties as well as excellent abrasion and wear resistance. These foams have been primarily used in the building field as fillers for building materials. Usually the building material, such as plywood, sandwiches the polyurethane foamed resins. This took advantage of the excellent insulating properties of polyurethane foam resin. However, the plywood was necessary because the foamed polyurethane lacked the structural strength necessary to withstand the stresses it would encompass if used as the sole building material. Therefore, the prior building manufacturers use plywood or other building material to supply the necessary structural strength to molded foam synthetic resins.

Polyurethane and other synthetic foam resins have been molded to form a wallboard. These molded foams, however, are brittle and as stated before, lack any degree of structural strength. These boards, however, are not used, for example, as a curtain wall but are used mainly where strength and brittleness are not a factor—merely as a wall covering such as plasterboard.

The present invention utilizes a foamed synthetic resin expandable building panel which has the beneficial abrasion resistance properties, wear resistance properties, insulating properties of foamed synthetic resins and also has the necessary strength rigidity to withstand the stresses encountered by loading bearing building panels such as curtain walls.

It is therefore an object of the present invention to provide a reinforced foamed synthetic resin expandable building panel.

Yet another object of this invention is to provide an expandable wall panel comprised of a pair of panel sections which are identical to one another and are provided with means for varying the thickness of the wall panel.

Still another object of the present invention is to provide a foamed synthetic resin expandable building panel which may be used as a curtain wall of a house or similar building structure.

It is a further object of the present invention to provide a method of forming an expandable foam polyurethane structural building panel.

It is still another object of the present invention to provide an expandable polyurethane foam reinforced building panel.

Other objects, features and advantages of the present invention will be apparent from the following detailed description taken in conjunction with the accompanying figures of the drawings.

On the drawings:

FIGURE 1 is a fragmentary front elevation of installed building panels constructed in accordance with the present invention;

FIGURE 2 is a vertical section taken along the lines II—II of FIGURE 1;

FIGURE 3 is a fragmentary perspective view of a pair of panel sections illustrating the manner of assembly; and FIGURE 4 is a transverse section of a modified form taken substantially on the line IV—IV looking in the direction indicated by the arrows, as shown in FIGURE 1.

As shown on the drawings:

The structural boards and panels of the present invention are made from any suitable foamed synthetic resin, i.e., foamed polystyrene beads such as Pelaspan 8 and Pelaspan 18, polystyrene flakes, epoxy resin, polyurethane of the polyester and polyurethane of the polyether type. The load bearing panels of the present invention are formed by conventional methods of forming and molding synthetic resins. The panels will be constructed either by batch hand pour, mechanically mixed or froth foam, and will be cured by the room temperature or elevated temperature methods. The elevated temperature methods will use internal heating elements such as steam, hot oil and electrical means within the mold or the external methods with a box or batch type oven. The density of the molded foam synthetic resin board with the reinforcement embedded therein is between 1.7 to 15 pounds per cubic foot.

A preferred synthetic resin for the structural panel board or section of the present invention is polyurethane. The panel section is formed by preparing an essentially homogeneous foamable mixture of polyisocyanate, an active hydrogen containing organic substance capable of forming polyurethane structure with said polyisocyanate, and a foam blowing agent. The mixture, which contains a sufficient blend for generating a resultant body of foam that will exert positive pressure on the mold surface, is then poured into the mold. The mixture is foamed and cured in the mold whereby the resultant positive pressure forms a smooth-skinned article, whereupon the article is removed from the mold.

For foaming and curing of the product it has been preferred to use an enclosing mold having the reinforcing means attached in place in the mold and overcharging the mold with reactant mix, i.e., there is more mix poured into the mold than would be necessary to just fill the total mold cavity with foam. The excess charge of mix results in a foam that exerts a positive pressure, that is, about 2 to 20 p.s.i., on all mold surfaces which helps produce a skin on the molded article and enhances its final appearance as discussed above. A bleeder may be used to control mold pressure.

The panel may also be produced by use of a froth foaming method whereby a gun has a mixing nozzle so that the material may be mixed and discharged into the panel mold.

A board of the present invention is provided by taking a foamable mixture of 100 parts by weight of resin and 87 parts by weight of prepolymer, and vigorously agitating at 78° F. The mixture is then poured into a mold. The mold is capped and locked. After the foaming action has stopped and subsequently cured, the mold is dismantled, the plugs removed, and the finished smooth, curtain wall panel section is ready for installation.

Either the semi-prepolymer or the one-shot formulation technique is acceptable for preparing the polyurethane (polyester or polyether) foamable mixture for use in this invention. In the semi-prepolymer process the total polyisocyanate called for in the formulation is premixed with less than all of the active hydrogen-containing compound of the final product, and the reaction is allowed to take place between these two components. This resulting semi-prepolymer is then vigorously blended with the remaining formulary ingredients plus the rest of the active hydrogen-containing compound to form a foamable mixture.

In the one-shot technique all the ingredients called for in the formula are initially vigorously mixed so that conversion of raw ingredients to a foamable mixture is accomplished in a single stage. With either technique a homogeneous mixture of foamable ingredients is made, and with either technique dyes or pigments can be added during the processing of the raw materials. After vigorous mixing, the resulting mixture will be colored in a uniform manner in correspondence with these dyes, stains, pigments, or combinations thereof. Therefore, the foamable mixtures may be the color of the formulary ingredients or that of a pigment or dye addition.

Any polyurethane foam type is suitable for the making of a board of the present invention, i.e., rigid, semi-rigid, or flexible. In this connection, organic compounds containing active hydrogen include those wherein such hydrogen content is small, resulting in minimal polymer cross-linkage and those of greater active hydrogen content. The former compounds produce flexible foams whereas the latter compounds initiate greater chain cross-linkages and can play a part in forming semi-flexible or rigid foams. Additionally, combinations of urethane group reactive hydrogens with isocyanate can be taken advantage of to give polymers cross-linking and resultant foam rigidity. Small amounts of water may be added to combine with the isocyanate group to form an amine. The amine will react with isocyanate to give a urea, which will then react in a polymer cross-linking manner with additional isocyanate to form biuret bridges. The biuret bridges add further strength to the foam structure.

The foam forming reaction can be manipulated by conventional catalysts, and the cell size of the foam may be controlled by the addition of suitable surfactants such as conventional silicone oil or polyglycol-silicone polymer. Examples of reaction catalysts include n-methylmorpholine, tetramethylbutanediamine, tri-ethylenediamine, stannous octoate, and dibutyl tin dilaurate.

Foaming of the reactants is conventionally handled by either dissolving a blowing agent in the foaming mixture or by adding water to such a mixture. In water addition, carbon dioxide for foaming will be produced by either the reaction between an isocyanate and water to form an amine or it will be produced when water reacts with the urethane linkage of a semi-prepolymer mix. If the water addition method is not employed, suitable conventional halogenated propellants such as dichlorodifluoromethane, trichloromonofluoromethane, trifluoromonochloromethane and mixtures of same may be added to the mixture for foaming.

The present invention provides the building industry with a lightweight board and panel that are used to construct a house, apartment building, motels, and similar structures. The boards and panels of the instant invention may be conveniently handled and rapidly installed by relatively few workers. As a result the overall cost of the building is drastically reduced. Reduction in cost, of course, is a major consideration in the highly competitive building industry.

The building boards of the present invention are made from reinforced foamed synthetic resin and not only reduce the cost of comparative size buildings but also provide building structures of longer endurance. The reinforced foamed synthetic resin board or panel has excellent strength to resist structural stresses encountered; has excellent insulating properties to reduce the cost of heating or cooling the building; has excellent wear, abrasion and weather resistance; and may easily be provided with additional materials to give it any desired beneficial properties.

Although the drawings illustrate the panels and boards of the instant invention as being used as a curtain wall, it is of course understood that these various embodiments are merely to exemplify my invention and are in no way meant to limit the boards for use as curtain walls. The boards and panels of the present invention are advantageously used wherever an expandable wall is needed as the thickness of the wall can be readily varied, as desired.

Referring to FIGURE 1, there is shown an expandable curtain wall 10. The expandable curtain wall is composed of a plurality of expandable reinforced foam synthetic resin wall panels 17 provided in accordance with the present invention. The expandable panels 17 are fastened to a ceiling support 11 and a floor support 12 by rectilinear U-brackets 13 and 14. The U-brackets 13 and 14 are fastened to the floor and ceiling support by screws 15 and 16 or any suitable attaching means.

Each expandable panel 17 is comprised of a pair of identical panel sections 18. Each panel section 18 includes spaced flange legs 18a formed on a main panel section portion 18b as well as stepped areas defining steps 18c and 18c on opposite ends of the main panel section portion 18b. The steps 18c and 18c are formed so that panel 17 may sit in flush contact with the U-brackets 13 and 14, as is shown in FIGURE 2, and present a relatively even surface therewith. The brackets 13 and 14 include spaced vertical bracket legs 13a and 14a, as well as floor and ceiling engaging bracket legs 13b and 14b, which are engaged flush with the stepped areas 18c and 18c.

The panel 17, as illustrated in FIGURES 2 and 3, defines two passageways 17a, 17a, with identical rectangular cross-sections. The particular number and configuration of the passageways can be varied in accordance with particular desires of the builder. The passageways provide the panel with an increased sound proofing quality and advantageously provide the panel with ducts used to conduct heat or cooling air to the house. The passages also provide a means for supplying the necessary duct work for plumbing, wiring and similar types of installations.

The panel has reinforcing means comprising mesh or rod screens 19 embedded in each foam synthetic resin body or panel section 18. The reinforcing means includes an angled screen 20 and a pair of smaller angled screens 21, 21. Screen legs 20 and 21a extend into panel section legs 18a for reinforcing the same. The angled screen 20 further includes an elongated screen leg 20b which extends the width and length of main panel section portion 18b.

A typical reinforcing screen is quarter inch wire welded steel rods having a No. 3 to a No. 7 type mesh. It is of course understood that wire screens are not the only type of reinforcing means that may be used. Embedded rods, expanded metal laths, and similar means are applicable to provide the reinforced foamed synthetic resin structural building panel or board of the present invention.

The wall panel sections 18 illustrated by FIGURES 1–3 has a thin asbestos covering 23 on its outer face thereof and a thin asbestos covering 24 on its inner face for extending around the entire perimeter of the passageways 17a. The asbestos covering aids in supplying fireproofing and heat resistance to the wall panel. It is fastened to the wall panel in any suitable manner, i.e., bonded thereto with an adhesive molded thereto during the molding of the wall panel, and by any suitable mechanical fastening means.

It is, of course, understood that the asbestos cover is not necessary. The outer surface of the board may form the wall face. Synthetic resins are easily dyed prior to pre-forming and therefore may have a colored wall that needs no additional plastering or painting. However, if painting or plastering is desired, the foam synthetic resin has a surface which is readily adaptable for such finishing.

The panels may be connected to each other by a tongue and groove connection if desired. It is, of course, understood that any suitable type of connecting means may be utilized to secure the panels 17 sidewise with one another.

It is not necessary to have passages formed throughout the panel. Panels with passageways are preferred because they not only reduce the weight of the panel, and improve soundproofing, but also less material is needed.

The identically constructed sections 18 of each expandable wall panel 17 may be adjusted with respect to one another as shown in FIGURE 3 before the section legs 18a are secured together by adhesive 25 (FIGURE 4) in order to provide the panels 17 with the desired thickness.

The adhesive 25 may be of any suitable type for bonding polyurethane members in assembly together. The thickness of the wall panel 17 may be varied by altering the area of engagement between the legs 18a on the pair of sections 18 comprising each wall panel 17.

It is a further significant to note that the leg 18a on one end of each panel section 18 is inset from the end of the main panel section portion a distance corresponding to the width of the leg 18a to receive a leg 18a from the associated section 18 whereby opposite ends of the wall panels are provided with relatively flat surfaces 17b—17b.

Another beneficial aspect of the present invention is brought out by FIGURE 4 where a modified expandable wall panel 17′ is illustrated. The panel 17′ is identical to the panel 17 except it has a veneer facing 26 attached thereto. This veneer facing may take the form of wood, brick, marble, tile, and any similar material.

The veneer facing is illustrated as being only on one side of the panel and fastened to the asbestos covering 23. However, this is merely for illustrative purposes only and the veneer may be placed on both sides of the expandable wall panel and the asbestos covering may be eliminated. Therefore, a building using the panels of the present invention for a curtain wall is able to provide walls for one room with a wood finish while the walls that are formed by the same panels in an adjacent room may have a different type of finish. This is also applicable when the panels of the instant invention are used for the exterior walls of the building. The exterior surface may be provided with a brick facing and the interior with another facing such as wood.

This type of veneer finishing allows the building to provide a wall with inexpensive wood face or expensive marble face at relatively a fraction of the cost of using the material in its non-veneer form. The veneer facing is fastened to the panel in any suitable manner, i.e., bonded thereto with an adhesive, molded thereto during the molding of the wall panel, and by any suitable mechanical fastening means. The veneer lends no structural strength to the board of the present invention, but is utilized merely to give an exterior beautification of the panel of the present invention. As is realized, the veneer will slightly add to the weight of the board, but the board is still appreciably lighter than structural boards presently used.

It has been further found that excellent results can be obtained by using a urea type synthetic plastic foam of a closed cell rigid type which would preferably have rigid closed cell characteristics similar to the polyurethane type panel also disclosed herein.

Although minor modifications might be suggested by those versed in the art, it should be understood that I wish to embody within the scope of the patent warranted hereon, all such modifications as reasonably and properly come within the scope of my contribution to the art.

I claim:
1. An expandable building panel comprising:
   a pair of lightweight plastic sections each having a main panel portion and a set of spaced flange legs of uniform length and width on one side thereof;
   one of said legs projecting from the edge of said main panel portion and another leg spaced from the opposite edge by a distance equal to the width of the legs;
   the legs on said sections being engageable in side-by-side relation;
   and reinforcing means embedded in said main panel portion and said legs of each section.
2. An expandable building panel comprising:
   a pair of reinforced molded sections each having a main panel portion and a set of spaced flange legs of uniform length and width on one side thereof;
   one of said legs projecting from the edge of its main panel portion and another leg spaced from the opposite edge of its main panel portion by a distance equal to the width of the legs;
   the legs on said sections being engageable in side-by-side relation;
   means securing said legs on said sections in side-by-side assembly with the main panel portions spaced apart a predetermined distance;
   said legs and said main panel portions defining a passageway extending the full length of said legs.
3. An expandable building panel construction comprising:
   a pair of reinforced molded sections each having a main panel portion;
   said main panel portions being coextensive and each having a set of spacing flange legs extending in spaced parallel relation throughout substantially the length of opposite side margins of the respective panel portions and disposed in complementary relation along the opposite edges of the panel portions such that one of the legs at each side projects in substantially the edge plane of the opposed panel portions and the respective legs of the sections having lapping surfaces which are normal to the respective planes of said panel portions whereby the panels are expandably adjustable relative to one another while said lapping surfaces remain together;
   and means securing said lapping surfaces of the legs in the expandably adjusted relation of the sections;
   said legs and the panel portions defining therebetween at least one passageway extending the full length of the panel sections and closed at the sides of the sections by the lapping legs.
4. An expandable building panel construction comprising:
   a pair of reinforced molded sections each having a main panel portion;
   said main panel portions being coextensive and each having a set of spacing flange legs extending in spaced parallel relation throughout substantially the length of opposite side margins of the respective panel portions and disposed in complementary relation along the opposite edges of the panel portions such that one of the legs at each side projects in substantially the edge plane of the opposed panel portions and the respective legs of the sections having lapping surfaces which are normal to the respective planes of said panel portions whereby the panels are expandably adjustable relative to one another while said lapping surfaces remain together;
   means securing said lapping surfaces of the legs in the expandably adjusted relation of the sections;
   said legs and the panel portions defining therebetween at least one passageway extending the full length of the panel sections and closed at the sides of the sections by the lapping legs;
   and additional flange legs on intermediate portions of said panel portions having lappingly related surfaces normal to the planes of said panel portions and dividing said passageway into a plurality of passages.
5. An expandable building panel construction comprising:
   a pair of rigid foamed polyurethane sections each having a main panel portion;
   said main panel portions being coextensive and each having a set of spacing flange legs extending in spaced parallel relation throughout substantially the length of opposite side margins of the respective panel portions and disposed in complementary relation along the opposite edges of the panel portions such that one of the legs at each side projects in substantially the edge plane of the opposed panel portions and the respective legs of the sections having lapping surfaces which are normal to the respective planes of said panel portions whereby the panels are expandably adjustable relative to one another while said lapping surfaces remain together;

means securing said lapping surfaces of the legs in the expandably adjusted relation of the sections:

said legs and the panel portions defining therebetween at least one passageway extending the full length of the panel sections and closed at the sides of the sections by the lapping legs:

and reinforcing means embedded in said panel portions and in said legs and the reinforcing means of the legs and the panel portion of each section being fixedly connected whereby to afford a section structure which is thoroughly resistant to deflections resulting from compressive loading of the panel.

6. An expandable building panel construction comprising:

a pair of reinforced molded sections each having a main panel portion;

said main panel portions being coextensive and each having a set of spacing flange legs extending in spaced parallel relation throughout substantially the length of opposite side margins of the respective panel portions and disposed in complementary relation along the opposite edges of the panel portions such that one of the legs at each side projects in substantially the edge plane of the opposed panel portions and the respective legs of the sections having lapping surfaces which are normal to the respective planes of said panel portions whereby the panels are expandably adjustable relative to one another while said lapping surfaces remain together;

means securing said lapping surfaces of the legs in the expandably adjusted relation of the sections;

said legs and the panel portions defining therebetween at least one passageway extending the full length of the panel sections and closed at the sides of the sections by the lapping legs;

and channel members engaging the remaining edges of said panel and closing the opposite ends of said passageway.

7. A building structure comprising a plurality of expandable panel assemblies, comprising:

each of the panel assemblies having a pair of opposed spaced coextensive panel sections each of which has a panel portion parallel to the opposed panel portion and a set of spacer flange legs projecting toward the opposed panel portion with each leg of each section lappingly engaging a complementary leg of the opposite section, the lapping surfaces of the legs being in planes normal to the panel portions so that the sections can be expandably adjusted substantially throughout the length of the legs to vary the spacing between the sections;

said panels being disposed in a common plane in edge-to-edge relation;

each of said panels having a pair of said legs located along each joinder edge of the section with one leg of each pair substantially flush with its joinder edge, and said pairs of legs closing respective passageways within the panels extending throughout the panels in the same direction as said joinder edges;

and means engaging the remaining edges of said panels and closing said passageways along such remaining edges.

8. The building structure of claim 7, in which each of said panel sections has one of the legs along one of its joinder edges substantially flush with such edge and the leg associated with the opposite joinder edge spaced from such opposite edge by a distance equal to the width of the legs and the flush and spaced legs of the opposed sections being complementally arranged to effect said flush disposition of one leg of each pair with said joinder edges in the assembly.

9. In a building structure comprising a plurality of inter-connecting barriers, said barriers comprising a plurality of adjoining expandable structural buildings panels, the improvement of said structural building panel constituting a component of at least one of said barriers and with said panels being arranged to carry compressive loading, each of said panels comprising a pair of opposed coextensive complementary sections generally identical in basic construction each having a body comprised of a lightweight molded synthetic resin having exterior longitudinally extending body surfaces and connector flange legs extending throughout substantially the entire length of the confronting body surfaces of the sections and providing lapping surfaces which are normal to the respective planes of said body surfaces whereby the panels are expandably adjustable relative to one another while said legs remain in the lapping relation, means between and securing said lapping surfaces of the legs together in the expandably adjusted relation of the sections, and each section having a metallic reinforcing network embedded in said body and said legs extending coextensive throughout the length of said section, the network in each panel comprising first reticulated sections spaced interiorly from and between said exterior longitudinally extending body surfaces, and reticulated sections in said legs joining said first reticulated sections thereby forming a unitary reinforcing assembly, said reinforcing assembly resisting deflection resulting from compressive loading of the panel.

10. An expandable wall panel capable of being used as a wall for a building structure, comprising a pair of water insensitive and water insoluble rigid polyurethane sections each having a main panel section portion and a set of spaced legs of uniform length and width on one side thereof, one of said legs projecting from the edge of said main panel section and another leg spaced from the opposite edge by a distance equal to the width of the legs, the legs on said sections being engageable in side-by-side relation, means securing said legs on said sections in side-by-side assembly together with the main panel portion spaced apart a predetermined distance, at least one passageway defined by the legs and the inner surfaces of the main panel sections extending vertically between said panel sections, wire screen means embedded in the main panel section portion and said legs of each section, and said wire screen means spaced substantially inwardly from the perimeter of said panel sections.

References Cited by the Examiner

UNITED STATES PATENTS

| 664,658 | 12/1900 | Massaro | 52—600 |
|---|---|---|---|
| 1,406,989 | 2/1922 | Lichtenberg | 52—576 |
| 1,514,714 | 11/1924 | Needham | 52—303 |
| 2,335,948 | 12/1943 | Leehvis | 52—602 |
| 2,546,290 | 3/1951 | Anderson | 52—574 |
| 2,548,576 | 4/1951 | Willson | 52—602 |
| 2,576,073 | 11/1951 | Kropa | 52—309 |
| 3,082,486 | 3/1963 | Khawam | 52—309 |
| 3,157,144 | 11/1964 | De Jarnett | 52—600 |
| 3,220,151 | 11/1965 | Goldman | 52—309 |

FOREIGN PATENTS

| 236,934 | 1959 | Australia. |
|---|---|---|
| 245,989 | 1961 | Australia. |

FRANK L. ABBOTT, *Primary Examiner.*

R. A. STENZEL, *Assistant Examiner.*